US011858191B2

(12) United States Patent
Schiffmann

(10) Patent No.: US 11,858,191 B2
(45) Date of Patent: *Jan. 2, 2024

(54) METHOD FOR PRODUCING A MULTI-LAYER COMPOSITE FILM, MULTI-LAYER COMPOSITE FILM, AND USE THEREOF

(71) Applicant: KUHNE ANLAGENBAU GMBH, St. Augustin/Menden (DE)

(72) Inventor: Jürgen Michael Schiffmann, Hennef (DE)

(73) Assignee: KUHNE ANLAGENBAU GMBH, St. Augustin/Menden (DE)

(*) Notice: Subject to any disclaimer, the term of this patent is extended or adjusted under 35 U.S.C. 154(b) by 92 days.

This patent is subject to a terminal disclaimer.

(21) Appl. No.: 17/607,805

(22) PCT Filed: Apr. 30, 2020

(86) PCT No.: PCT/EP2020/062164
§ 371 (c)(1),
(2) Date: Oct. 29, 2021

(87) PCT Pub. No.: WO2020/225138
PCT Pub. Date: Nov. 12, 2020

(65) Prior Publication Data
US 2023/0211534 A1    Jul. 6, 2023

(30) Foreign Application Priority Data
May 3, 2019  (DE) .................. 102019111524.8

(51) Int. Cl.
*B32B 27/08*    (2006.01)
*B29C 48/00*    (2019.01)
(Continued)

(52) U.S. Cl.
CPC .......... *B29C 48/0018* (2019.02); *B29C 48/08* (2019.02); *B29C 48/21* (2019.02);
(Continued)

(58) Field of Classification Search
CPC ......... B29C 48/02; B29C 48/08; B29C 48/21; B29C 55/005; B29C 55/12;
(Continued)

(56) References Cited

U.S. PATENT DOCUMENTS

| 7,504,143 B2 | 3/2009 | Schief |
| 2004/0009360 A1 | 1/2004 | Eugenio |

(Continued)

FOREIGN PATENT DOCUMENTS

| AU | 2001252149 B2 | 7/2005 |
| CN | 1173430 A | 2/1998 |

(Continued)

OTHER PUBLICATIONS

International Search Report for PCT/EP2020/062164 (dated Jul. 23, 2020).

(Continued)

*Primary Examiner* — Lawrence D Ferguson
(74) *Attorney, Agent, or Firm* — Merchant & Gould P.C.

(57) ABSTRACT

A method is for producing a coextruded and biaxially stretched composite film using a novel combination of stretching and relaxation steps. A corresponding composite film has little or no shrinkage.

17 Claims, 3 Drawing Sheets

(51) Int. Cl.
- *B29C 48/08* (2019.01)
- *B29C 48/21* (2019.01)
- *B29C 55/14* (2006.01)
- *B32B 7/02* (2019.01)
- *B32B 27/30* (2006.01)
- *B32B 27/32* (2006.01)
- *B32B 27/34* (2006.01)
- *B32B 27/36* (2006.01)
- *B29K 23/00* (2006.01)
- *B29K 27/00* (2006.01)
- *B29K 67/00* (2006.01)
- *B29K 77/00* (2006.01)

(52) U.S. Cl.
CPC .............. *B29C 55/143* (2013.01); *B32B 7/02* (2013.01); *B32B 27/08* (2013.01); *B32B 27/304* (2013.01); *B32B 27/306* (2013.01); *B32B 27/32* (2013.01); *B32B 27/34* (2013.01); *B32B 27/36* (2013.01); *B29K 2023/00* (2013.01); *B29K 2023/086* (2013.01); *B29K 2027/08* (2013.01); *B29K 2067/003* (2013.01); *B29K 2077/00* (2013.01); *B32B 2250/03* (2013.01); *B32B 2250/04* (2013.01); *B32B 2250/05* (2013.01); *B32B 2250/24* (2013.01); *B32B 2307/518* (2013.01); *B32B 2307/72* (2013.01); *B32B 2307/732* (2013.01)

(58) Field of Classification Search
CPC ............ B29K 2027/08; B29K 2023/00; B29K 2995/0012; B29K 2995/0063; B29K 2995/0097; B32B 1/00; B32B 1/08; B32B 2250/03; B32B 2250/05; B32B 2250/24; B32B 2270/00; B32B 2307/31; B32B 2307/412; B32B 2307/414; B32B 2307/518; B32B 2307/54; B32B 2307/72; B32B 2307/7244; B32B 2307/7246; B32B 2307/7248; B32B 2307/732; B32B 2307/736; B32B 2307/75; B32B 2439/46; B32B 2439/70; B32B 27/08; B32B 27/304; B32B 27/306; B32B 27/308; B32B 27/32; B32B 27/327; B32B 27/34; B32B 27/36; B32B 7/027; B32B 7/12; B65D 65/40; B63B 27/24; E21B 33/076; F16L 39/06; Y10T 137/86268
See application file for complete search history.

(56) References Cited

U.S. PATENT DOCUMENTS

| | | | |
|---|---|---|---|
| 2009/0061129 | A1 | 3/2009 | Fraschini |
| 2009/0196962 | A1 | 8/2009 | Gkinosatis |
| 2010/0003432 | A1 | 1/2010 | Schiffman |
| 2010/0003433 | A1 | 1/2010 | Ishii et al. |
| 2010/0151219 | A1 | 6/2010 | Busch et al. |
| 2017/0066228 | A1 | 3/2017 | Fusarpoli |
| 2017/0198123 | A1 | 7/2017 | Zanaboni |
| 2017/0321024 | A1 | 11/2017 | Roberto et al. |
| 2018/0264787 | A1 | 9/2018 | Hausmann et al. |

FOREIGN PATENT DOCUMENTS

| | | |
|---|---|---|
| CN | 102781666 A | 11/2012 |
| CN | 105473649 A | 4/2016 |
| CN | 105899358 A | 8/2016 |
| CN | 106794683 A | 5/2017 |
| DE | 10227580 A1 | 1/2004 |
| DE | 10254172 A1 | 6/2004 |
| DE | 19916428 B4 | 6/2004 |
| DE | 10048178 B4 | 12/2005 |
| DE | 102006036844 A1 | 1/2008 |
| DE | 102006046483 A1 | 4/2008 |
| EP | 1190847 B1 | 2/2004 |
| EP | 0476836 B2 | 7/2004 |
| EP | 1084035 B1 | 7/2005 |
| EP | 1985444 A1 | 10/2008 |
| EP | 2067705 A1 | 10/2009 |
| EP | 2147783 A1 | 1/2010 |
| EP | 1857271 B1 | 8/2011 |
| RU | 2446692 C2 | 4/2012 |
| WO | 0026024 A1 | 5/2000 |
| WO | 2008038776 A1 | 3/2008 |
| WO | 2018134224 A1 | 7/2018 |

OTHER PUBLICATIONS

Chinese Office Action received for CN Application No. 202080030501.8 dated Jan. 19, 2023, 14 pgs.
Japanese Office Action received for JP Application No. 2021-564854 dated Dec. 6, 2022, 13 pgs.
OA for DE Application No. 11-2020-0001371.5 dated Aug. 1, 2022. (8 pages).
In: Wikipedia, The free encyclopedia (Die Freie Enzyklopadie.) Edit: (Bearbeitungsstand) Oct. 26, 2019, URL: https://de.wikipedia.org/wiki/polyamide [abgerufen am Oct. 28, 2019].
In: Wikipedia, The free encyclopedia (Die Freie Enzyklopadie.) Edit: (Bearbeitungsstand) URL: https://de.wikipedia.org/wiki/polyethylenterephthalat [abgerufen am Oct. 28, 2019].
Office Action of corresponding German Application 10 2019 111460.8, dated Oct. 28, 2019, 16 pgs.
International Search Report and Written Opinion of the International Searching Authority, Issued in PCT/EP2020/062166, dated Jul. 30, 2020; ISA/EP, 24 pgs.
International Preliminary Report on Patentability issued in PCT/EP2020/062166, dated Nov. 2, 2021, 15 pgs.
Office Action from corresponding German Application No. 10 2019 111 454.3 dated Oct. 28, 2019, 20 pgs.
International Search Report and Written Opinion of the International Searching Authority, Issued in PCT/EP2020/062165, dated Jul. 30, 2020; ISA/EP, 24 pgs.
Office Action from corresponding German patent application No. DE 102019111458, dated Oct. 28, 2019, 19 pgs.
International Search Report and Written Opinion of the International Searching Authority, issued in PCT/EP2020/062162, dated Jul. 30, 2020; ISA/EP, 24 pgs.
Russian Office Action with English Translation for Application No. 2021134959, dated Apr. 30, 2020, 13 pgs.
Australian Examination Report No. 2 dated Jun. 8, 2022 in corresponding Australian Application No. 2020267808, 4 pgs.
Chinese Office Action dated Nov. 9, 2022 in corresponding Chinese Application No. 202080028369.7, 21 pgs.
Canadian Office Action dated Dec. 20, 2022 in corresponding Canadian Application No. 3132791, 5 pgs.
International Preliminary Report on Patentability issued in PCT/EP2020/062162, dated Nov. 2, 2021, 15 pgs.
International Preliminary Report on Patentability issued in PCT/EP2020/062165, dated Nov. 2, 2021, 15 pgs.
In: Wikipedia, The free encyclopedia Edit: Oct. 26, 2019, URL: https://11de.wikipedia.org/wiki/polyamides [accessed on Oct. 28, 2019], 3 pgs.
In: Wikipedia, The free encyclopedia Edit: URL: https://11de.wikipedia.org/wiki/polyethylenterephthalat [accessed on Oct. 28, 2019], 16 pgs.

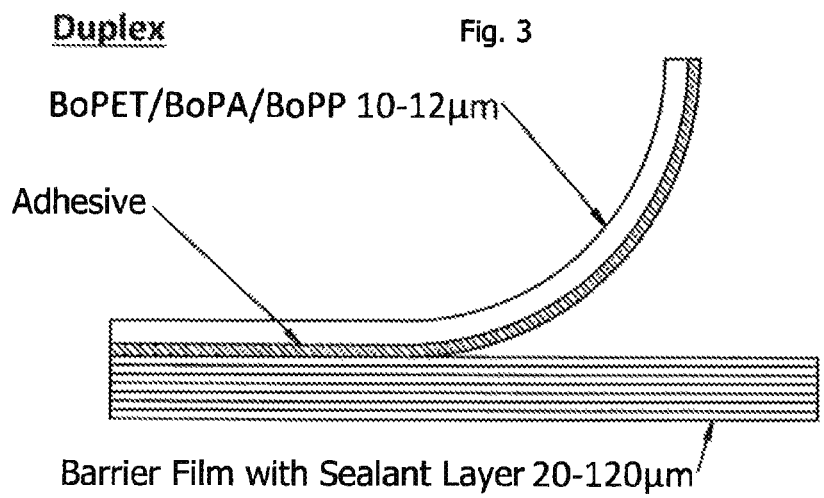
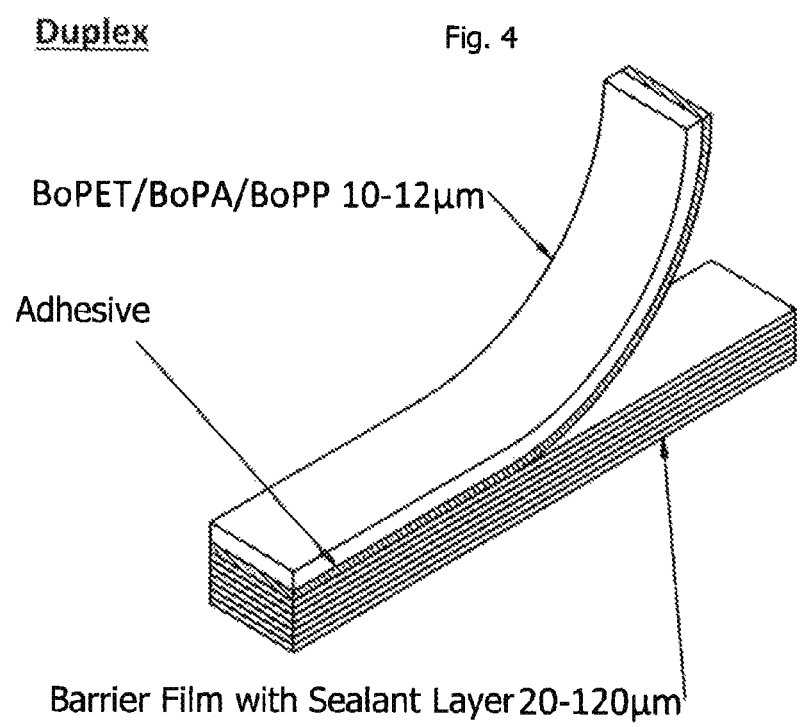

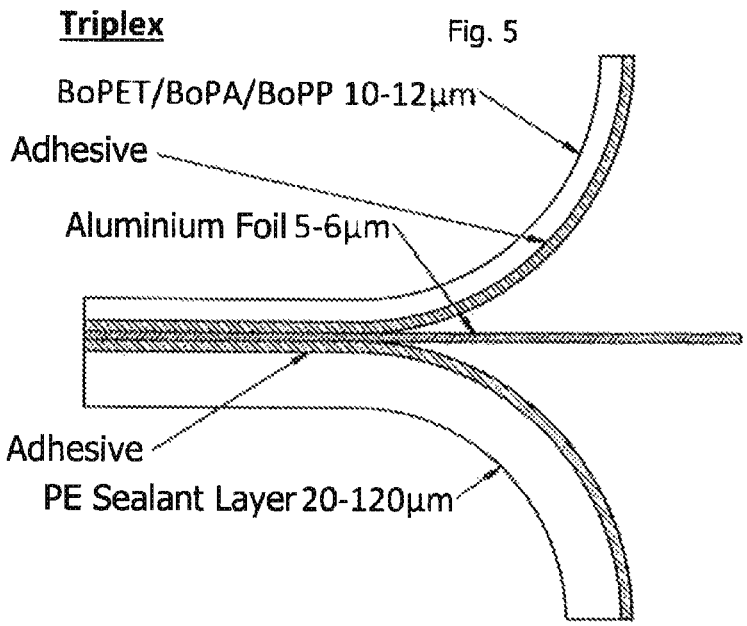
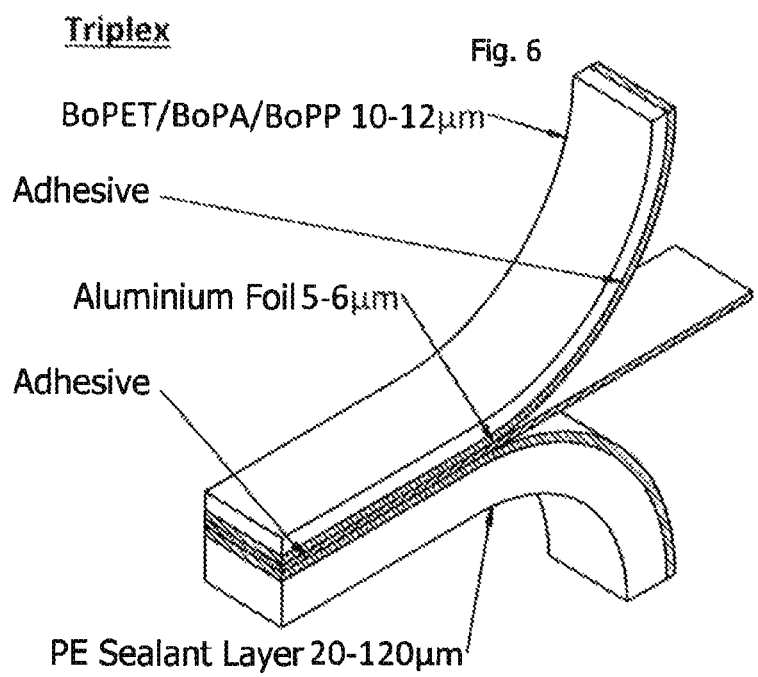

METHOD FOR PRODUCING A MULTI-LAYER COMPOSITE FILM, MULTI-LAYER COMPOSITE FILM, AND USE THEREOF

CROSS-REFERENCE TO RELATED APPLICATIONS

This application is a National Stage of PCT/EP2020/062164, filed Apr. 30, 2020, which claims benefit of German Patent Application No. 102019111524.8, filed May 3, 2019, which applications are incorporated herein by reference. To the extent appropriate, a claim of priority is made to each of the above-disclosed applications

TECHNICAL FIELD

The present application relates to coextruded and biaxially stretched (biaxially oriented) multilayer films which can be used, for example, as packaging materials, in particular for food products, to a method for producing them and to their use, preferably for packaging a food product, a luxury food product or a liquid or solid, in particular powdered, good. However, the present application does not relate to laminated multilayer films, nor to corresponding producing processes.

BACKGROUND

On the one hand, laminated multilayer films are known from the state of the art, which are excellent packaging materials. Thus, laminates consisting of at least two or three or even more independently produced layers are widely used in the packaging market. Essentially, a distinction is made between the so-called "duplex" laminate films and the so-called "triplex" laminate films. "Duplex" laminate films are films extruded by the cast or blow process, including barrier films with 5, 7 or 9 layers, which are laminated (adhered or bonded) together in a separate process with a biaxially stretched film of either polyethylene terephthalate (PET), polyamide (PA) or polypropylene (PP), again produced separately. So far, only with these films produced and laminated in successive, separate process steps, the sum of the desired and/or required properties can be achieved. For example, two of the required properties (sealability and oxygen or aroma barrier) are achieved by the portion of the extruded mono or multilayer film, and other properties such as printability, heat resistance and mechanical strength are achieved by the portion of the film that is separately biaxially stretched. In addition, it is also common practice to specifically achieve or increase the oxygen barrier by means of metallization applied in a further process step.

Examples of Duplex Films Commonly Used in the Market

| Film type | Oxygen barrier |
| --- | --- |
| BOPP/PE | none/low |
| BOPA/PE | none/low |
| BOPET/PE | none/low |
| BOPP/Metallization/PE | through metallization |
| BOPA/Metallization/PE | through metallization |
| BOPET/Metallization/PE | through metallization |
| BOPET/PE-HV-EVOH-HV-PE | by barrier layer such as EVOH |
| BOPET/PE-HV-PA-EVOH-PA-HV-PE | by barrier layer such as EVOH |

| Duplex film | Heat resistance/melting temperature of the outermost layer | Printability | Shrinkage at 90° C. |
| --- | --- | --- | --- |
| BOPP/met/PE | 164° C. | 32 dyn/cm | 1-2% |
| BOPET/met/PE | 250° C. | 43 dyn/cm | 0-1% |
| BOPET/5-layer barrier film (PE/HV/EVOH/HV/PE) | 250° C. | 43 dyn/cm | 0-1% |
| BOPET/7-layer barrier film (PE/HV/PA/EVOH/PA/HV/PE) | 250° C. | 43 dyn/cm | 1-2% |

The "triplex" laminating film is similar, wherein the sum of the desired and/or required properties is produced with three films produced separately and being laminated (adhered or bonded) to each other later on.

In this case, a biaxially stretched film made of PET, PA or PP is laminated with a separate aluminum foil, and this composite is in turn laminated with an extruded cast or blown film.

Here, the extruded cast or blown film takes on the task of sealability, the aluminum foil the task of a barrier and the biaxially stretched film the task of optimum printability, thermal resistance and mechanical strength. The disadvantage of laminating films, however, is that their producing is by nature complex, resource-consuming and expensive, and the entire film composite is often very thick, since a plurality of films must first be produced separately and these must then be adhered or bonded in several successive process steps by means of hotmelt or liquid adhesive to ultimately obtain a laminated multilayer film.

Examples of Triplex Film Commonly Used in the Market

| Film type | Oxygen barrier |
| --- | --- |
| BOPP/Alu/PE | through aluminum foil |
| BOPA/Alu/PE | through aluminum foil |
| BOPET/Alu/PE | through aluminum foil |

| Triplex film | Heat resistance/melting temperature of the outermost layer | Printability | Shrinkage at 90° C. |
| --- | --- | --- | --- |
| BOPP/Alu/PE | 164° C. | 32 dyn/cm | 0% |
| BOPA/Alu/PE | 220° C. | 43 dyn/cm | 0% |
| BOPET/Alu/PE | 250° C. | 43 dyn/cm | 0% |

Known duplex and triplex films are shown in FIGS. 1 to 6.

On the other hand, multilayer films are known from the state of the art, which are produced by means of coextrusion and biaxial stretching or biaxial orientation. The producing processes used for this purpose allow a multilayer film to be produced in just one process step by coextrusion, wherein subsequent bonding/laminating of individual film layers with the associated disadvantages is completely eliminated. At most, biaxial stretching of the coextruded raw multilayer film is carried out in order to achieve the desired sum of properties (sealability, thermal resistance, barrier, mechanical strength, printability). Apart from sealability, most of the required properties such as mechanical strength, thermal resistance, printability and barrier (essentially the oxygen or gas barrier) are achieved by using raw materials such as PET, PA, ethylene-vinyl alcohol copolymer (EVOH), polyvinyl alcohol (PVOH) or polylactic acid (PLA).

Thus, materials such as EVOH, PVOH, PVDC and PA are preferably used for obtaining the oxygen or gas barrier, but materials such as PET or PLA also provide a significantly better barrier protection compared to polyolefin-based raw materials such as PE or PP, especially after stretching, ideally even after biaxial stretching.

In addition, PET and PA in particular are used in the outermost layer of films to achieve particularly good thermal resistance and excellent printability, especially after biaxial stretching.

In addition to their outstanding thermal resistance, printability and good barrier properties against gas and oxygen, PA and PET in particular also make a decisive contribution to maintaining the desired mechanical strength, again especially after biaxial stretching.

Thus, numerous composites relating to this are known from the state of the art, such as: DE 10 227 580 A1, DE 10 254 172 A1, DE 10 2006 046 483 A1, DE 10 2006 036 844 A1, EP 0 476 836 B2, EP 1 190 847 B1, EP 1 084 035 B1, and EP 1 985 444 A1.

However, the embodiments and methods known from the state of the art have one thing in common, namely all these coextruded multilayer barrier films generally have a relatively large shrinkage of usually more than 20%, in any case always more than 5%, respectively in the machine direction (MD) and in the transversal direction (TD), which is advantageous or even desired for many applications, such as shrink bags/lidding films or cover films.

Examples of Coextruded Films Frequently Used in the Market

|   | Film type | Application |
|---|---|---|
| 1 | EVA/PVDC/EVA | a |
| 2 | PE/EVOH/PE | a |
| 3 | PP/EVOH/PP | b |
| 4 | PA/EVOH/PA/PE | a, b |
| 5 | PE/PA/EVOH/PA/PE | a, b |
| 6 | PA/PE/PA/EVOH/PA/PE | a, b |
| 7 | PET/PE/PA/EVOH/PA/PE | a, b |
| 8 | PET/PP/PA/EVOH/PA/PE | a, b |

|   | Application | Film type | Shrinkage MD + TD |
|---|---|---|---|
| a | Shrink bag for meat or cheese | 1, 2, 4, 5, 6, 7, 8 | 25-50% |
| b | Lidding films for meat or cheese trays | 3, 4, 5, 6, 7, 8 | 5-20% |

| Coextruded biaxially stretched film (without radiation crosslinking and coating) | Heat resistance/ melting temperature of the outermost layer | Printability | Shrinkage at 90° C. |
|---|---|---|---|
| Shrink Film EVA/PVDC/EVA | 93° C. | 32 dyn/cm | 40-50% |
| Shrink film PE/EVOH/PE | 118° C. | 32 dyn/cm | 30-40% |
| Lidding film PP/EVOH/PP | 164° C. | 32 dyn/cm | 5-15% |
| Lidding film PET/PE/EVOH/PE | 250° C. | 43 dyn/cm | 10-20% |
| Lidding film PET/PE/PA/EVOH/PA | 250° C. | 43 dyn/cm | 5-15% |

However, multilayer barrier films produced by means of coextrusion and biaxial stretching, which have relatively low or no shrinkage (less than 5%, preferably less than 3%), respectively in the machine direction (M D) and in the transverse direction (TD), and sufficient barrier, sealability, thermal resistance, mechanical strength and printability, are lacking to date.

OBJECT OF THE INVENTION

It is therefore an object of the present invention to provide a method for producing a coextruded and biaxially stretched composite film, preferably a coextruded and biaxially stretched multilayer barrier film, and a resulting multilayer film, preferably multilayer barrier film, which has at least one of the following properties, preferably all of the following properties: sufficient oxygen and/or water vapor barrier, sealability, thermal resistance, printability, and mechanical strength even without further lamination process. The resulting multilayer barrier film should further have a relatively small or no shrinkage (less than 5%, preferably less than 3%) in the machine direction (MD) and in the transverse direction (TD), respectively.

BRIEF DESCRIPTION OF THE DRAWINGS

FIG. 3 is a side sectional view of a duplex film;

FIG. 4 is a side sectional view of a duplex film;

FIG. 5 is a side sectional view of a triplex film; and

FIG. 6 is a side sectional view of a triplex film.

DETAILED DESCRIPTION OF THE INVENTION

Figure 1:
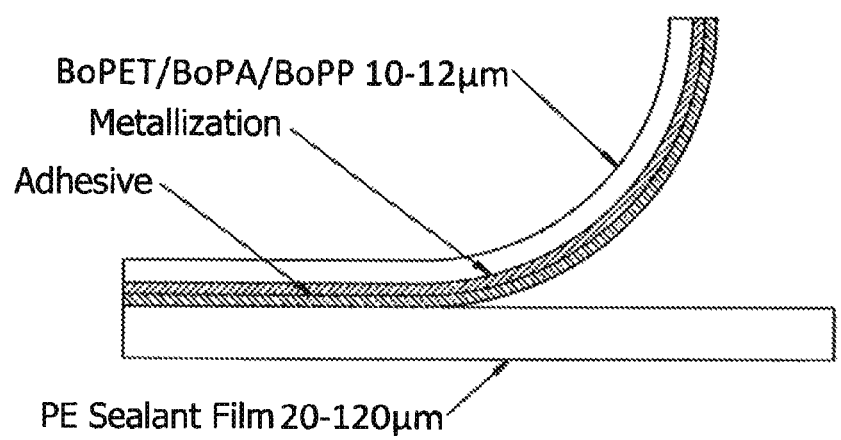
FIG. 1 is a side sectional view of a duplex film.
Figure 2:
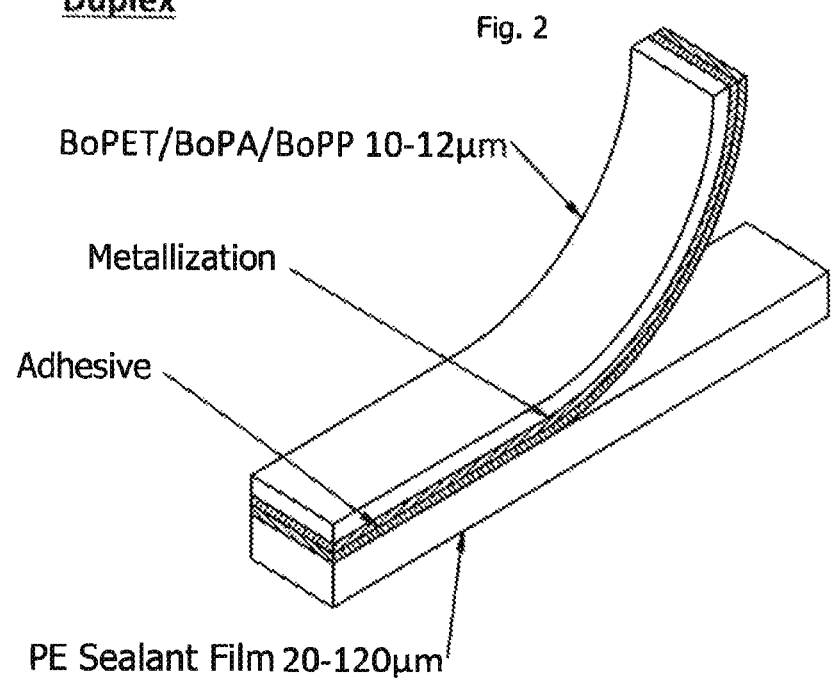
FIG. 2 is a side sectional view of a duplex film.

From the state of the art as well as the use in practice, it has been proven that materials such as PET and PA in the outermost layer have proven themselves to achieve the best possible printability and to maintain the highest possible thermal resistance. However, also materials such as PLA or EVOH are far more suitable from the point of view of printability, thermal resistance, further processability than polyolefin-based pipe materials such as PE or PP.

| Raw material | Heat resistance melting temperature DSG (ISO 11357) |
|---|---|
| Homo-PET | 250° C. |
| PA6 | 220° C. |
| PLA | 210° C. |
| EVOH (32 mol %) | 183° C. |

-continued

| | | | | | | | HD-PE | | | | 131° C. | |
| | | | | | | | Homo PP | | | | 164° C. | |

| Raw material | EVA 28% | EVA 18% | EVA 12% | LLDPE | mLLDPE | random Co-PP | Co-PP | EVOH | PLA | PA 6.66 | PA6 | Co-PET | homo PET |
|---|---|---|---|---|---|---|---|---|---|---|---|---|---|
| VST (° C.) DIN EN ISO 306 | 40-50 | 60-70 | 70-85 | 100-120 | 100-120 | 100-120 | 120-140 | 155-175 | 160-180 | 180-200 | 190-210 | 210-230 | 240-260 |

| Raw material | Printability or Polarity Surface tension (dyn/cm) |
|---|---|
| PE | 30-32 |
| PP | 30-32 |
| PET | 43 |
| PA | 43 |

In order to obtain the sufficient barrier against oxygen or gas, raw materials such as PET, PA, EVOH, PVOH and PVDC have been established.

| | Oxygen barrier | |
|---|---|---|
| Raw material | 65 % rel. humidity $\frac{cm^3}{m^2 * d * bar}$ | 80 % rel. humidity $\frac{cm^3}{m^2 * d * bar}$ |
| EVOH (PE 32 mol %) | 0.5 | 1.2 |
| EVOH (PE 44 mol %) | 1 | 2.3 |
| PVDC (extrusion resin) | 4 | 4 |
| PVDC (dispersion resin) | 10 | 10 |
| PAN | 8 | 10 |
| PET | 50 | 50 |
| PA6 | 35 | 50 |
| PVC | 240 | 240 |
| PE-HD | 2500 | 2500 |
| PP | 3000 | 3000 |
| PE-LD | 10000 | 10000 |
| EVA | 18000 | 18000 |

Source: Oxygen permeability at 20° C., measured for various barrier plastics (according to Kyoichiro; from: Joachim Nentwig, Kunststoff-Folien, 3rd edition, 2006. Carl Hanser Verlag; Table 26).

But as is known among experts, the barrier property of most of these raw materials is only sufficient if they are appropriately protected against moisture.

Therefore, if these raw materials are to provide barrier, they are always used in one of the middle or innermost layers of a film.

In order to obtain the best possible sealability, polyolefin-based raw materials, such as PE or PP, or similar, which have the lowest possible sealing temperature or melting temperature, should be used in any case, as is known from practical experience.

| Raw material | Melting temperature of sealing materials (ASTM D3418) |
|---|---|
| EVA 12% | 93° C. |
| EVA 18% | 84° C. |
| POP | 95° C. |
| mLLDPE | 118° C. |
| RaCoPP | 132° C. |

It is noticeable that the raw materials ideally used to achieve properties such as thermal resistance, printability and the oxygen barrier also have a much higher strength, in particular after biaxial stretching (=biaxial orientation), than polyolefins are only approximately capable of, even despite biaxial stretching.

In an optimum layer structure, the oxygen barrier layer should consequently consist of EVOH, PVOH or PA and be disposed in one of the middle or intermediate layers, and the sealant layer, consisting of a heat-sealable polyolefin, in the innermost layer.

The outermost layer should be formed by one of the heat-resistant and printable materials ideal for this purpose, such as PET or PA.

A closer look at the materials advantageous for properties such as thermal resistance, printability, oxygen barrier, as well as strength, reveals that all materials have various common features, for example, they all have a density of greater than 1.0 g/cm$^3$, they are all polar materials, and they almost all have a melting temperature of more than 170° C.

Further consideration of the raw materials to be used preferably as sealant layer also reveals that they all have a density of less than 0.95 g/cm$^3$ and a melting temperature <120° C.

| Raw material | Density (g/cm$^3$) |
|---|---|
| PET | 1.33 to 1.4 |
| PA | 1.12 to 1.14 |
| PLA | 0.124 to 0.125 |
| EVOH | 1.12 to 1.22 |
| PE | 0.89 to 0.96 |
| PP | 0.895 to 0.915 |

Not all of these raw materials with a density of greater than 1.0 g/cm$^3$ are equally ideal for printability, like PA or PET, or thermal resistance, like PET or PA. Nor do they all have an equally high oxygen barrier like EVOH, PVOH or PA, nor are they all equally strength-increasing like PA or PET. But all of them exhibit significantly improved properties in each of the individual properties, and even more so when they are combined in a composite film, particularly after biaxial stretching, than any polyolefin-based raw material.

Due to the different optimal characteristics of the raw materials with a density of greater than 1.0 g/cm$^3$ with regard to their thermal resistance, printability as well as oxygen barrier and the resulting ideally or preferably division into at least two separate layers, this division results in a further, very positive effect, namely a partly significant increase in the strength and stiffness of the film.

This effect becomes more pronounced, the further apart the two layers containing a raw material with a density of greater than 1.0 g/cm³ are from each other in the overall composite of the layers.

It is therefore necessary to select a layer structure which, on the one hand, comprises at least two independent layers with a density of greater than 1.0 g/cm³, wherein one of these layers forms the outermost layer and the other an intermediate layer. On the other hand, the composite film should contain a heat-sealable layer which forms the innermost layer and consists of a material, preferably a polyolefin, having a density of less than 0.95 g/cm³ and a melting temperature of less than 120° C.

Although such a layer structure solves the sum of all desired properties (in particular sufficient oxygen and/or water vapor barrier, sealability, thermal resistance, printability and mechanical strength) in an excellent manner, in particular after biaxial stretching, the adjustment or setting of the desired low shrinkage, in particular after biaxial stretching, is not yet solved thereby.

This cannot be solved on the raw material side alone, at least not if the film produced has undergone biaxial stretching. This requires a suitable producing process and/or a suitable treatment that fulfills this object.

Particularly after stretching, in particular after biaxial stretching, polymers or films made of polymers have a sometimes considerable shrinkage. This shrinkage varies depending on the polymer and is essentially dependent on whether and how much heat or temperature is applied to the film.

In other words, the higher the temperature and the longer the exposure time, the higher the shrinkage of the film.

Processes and treatments are known from the state of the art which are used for monoaxially stretched films, but also especially for biaxially stretched films, in order to reduce the shrinkage of the stretched films.

For monoaxially stretched films in particular, but also for biaxially stretched films, post-treatments are known, i.e. disposed after the stretching process (=orientation process), in which the films are guided over temperature-controlled rolls (so-called tempering rolls) with a wrap being as high as possible. This introduces heat or temperature into the film, i.e. thermally fixes it, and thus reduces the remaining shrinkage.

In the stretching (=orientation) of flat films, the so-called tenter frame process, post-treatments (tempering), also known as thermo fixings or heat-settings (thermally fixing), are also known, wherein the film is passed horizontally through a downstream heating oven after stretching and is treated with hot air, thereby reducing the shrinkage.

Furthermore, thermal post-treatments following stretching are also known from the so-called triple bubble or multibubble process for tubular films. In this process, the films in tubular form are passed through an oven and treated with temperature, in most cases, as in the tenter frame process, by means of hot air. Alternatively, the film is treated with infrared or hot water vapor in the triple bubble process to reduce the shrinkage caused by stretching.

For example, various technologies are known which reduce shrinkage following biaxial stretching by means of temperature application. However, in addition to the level of temperature applied, the time or duration of the temperature effect is also a significant factor here.

However, treating the film exclusively with heat/temperature in order not only to reduce the shrinkage in the films, but even to eliminate it completely, is only expedient and sufficient for a few film types.

For example, films produced in the tenter frame process, such as BoPET, BoPA or BoPP (Bo=biaxially oriented biaxially stretched), are stabilized by means of a very high heat treatment (thermo fixing) so that they contain very little to no shrinkage.

The situation is similar for certain types of film that have been biaxially stretched in the double-bubble process and then thermally fixed by means of tempering rollers or a horizontal hot-air oven. In this case, too, BoPP or BoPA films in particular are often treated or fixed exclusively by means of temperature, and then show no or very little shrinkage.

This is mainly due to the fact that, regardless of the stretching process, these types of films are single-type films in which only one type of raw material is used, BoPET (exclusively PET). BoPA (exclusively PA), BoPP (exclusively PP).

In this case, a high thermo fixing temperature (fixation temperature) corresponding to the raw material, up to just below the softening point or melting point, can be selected for stabilization, and thus, the shrinkage can be greatly reduced or even eliminated by the temperature treatment alone.

Up to now, however, this has been considered impossible for film types consisting of various raw materials, i.e. different types of raw materials, especially for raw materials with widely differing softening or melting temperatures.

In practice, for example, no coextruded or biaxially stretched films are known that contain a combination of various raw materials with widely differing softening or melting temperatures and, in addition, have no or only a very slight shrinkage despite stretching.

Exceptions to this are isolated multilayer films produced by the tenter frame process or double-bubble process. This essentially involves the following layer structure (from the inside to the outside; HV=adhesion promotor):

PP-HV-EVOH—HV-PP

Since HomoPP (homopolymeric PP; melting temperature: 155 to 165° C.) is used almost exclusively in combination with EVOH and EVOH types with a high ethylene content, which have a lower melting temperature than those with a low ethylene content (melting temperature: 170 to 180° C.), these composites can indeed be stabilized at similar temperatures almost exclusively by heat treatment, and the shrinkage can be reduced or eliminated.

However, these multilayer films based on PP, the majority of which consist of PP, do not exhibit the desired thermal resistance and certainly not the required printability.

Since even the most heat-resistant HomoPP types melt at temperatures below 170° C. and PP is also one of the most non-polar raw materials, which is completely unsuitable for printing without further post-treatment, PP is not an ideal raw material to be useed in the outermost layer.

In addition, as is well known in the market, these PP-based multilayer films have only very poor or moderate sealability, i.e. a relatively high sealing temperature, due to the PP types used and the fundamentally poorer sealing properties compared to preferred raw materials such as PE. Therefore, these films are conventionally laminated afterwards with PE-based films.

Consequently, a multilayer, coextruded and subsequently biaxially stretched film, which comprises a sealant layer with a low melting temperature, which has not been subsequently laminated, which furthermore contains a heat-resistant and printable (polar) outermost layer as well as an oxygen barrier layer located in the intermediate layers, and which has no or minimal shrinkage, is currently not considered to be producible.

This is due to the fact that such multilayer composites cannot be produced stably, or at all, at the temperature required to eliminate or reduce shrinkage below 5%, or better still below 3%, without further process measures.

Thus, even before the temperature required to eliminate shrinkage is achieved, individual layers in the multilayer composite soften or even melt, inevitably interrupting, or at least massively impairing, the film producing process.

When or at what temperature process impairments or even interruptions occur depends essentially on whether and how many layer portions of the entire film composite consist of non-polyolefin-based materials, i.e. temperature-resistant materials, with a density $>1.00$ g/cm$^3$ and a melting temperature greater than 170° C.

If the mass proportion of the materials with a density $>1.00$ g/cm$^3$ is more than 40% relative to the total mass of the film's layer structure, the composite film also permits treatment (thermo fixing) at temperatures of 80 to 100° C., and at a mass proportion of 50% and more even beyond that.

But even with a high mass proportion of materials with a density $>1.00$ g/cm$^3$ of 40% and more, as long as the film composite contains a sealant layer ofpolyolefin-based raw materials with a density $>0.95$ g/cm$^3$ and with a melting temperature of smaller than 120° C., process impairments or interruptions always occur before a residual shrinkage of less than 5% is reached, respectively in MD and TD, since the temperatures required for thermo fixing the films must be at least between 120 and 150° C., and in this case even materials with a density $>1.00$ g/cm$^3$ and with melting temperatures greater than 170° C. are no longer sufficient to keep the producing process stable.

In order not to impair the film producing process, only temperatures that do not completely eliminate shrinkage or shrink can be selected for thermal post-treatment.

In order to nevertheless reduce the shrinkage to a minimum or even eliminate it completely, a further process step is required in accordance with the invention. In addition to the treatment of biaxially stretched films with temperature to eliminate shrinkage, a further process step, namely relaxation, is common, especially in the triple-bubble or multi-bubble process. In this process, the film is allowed to shrink back again in a controlled manner after stretching or orientation; this is known as relaxation and takes place with the introduction of temperature or heat.

Relaxation can take place in both directions, i.e. in the production direction or machine direction (MD) as well as in the transversal direction to production (TD).

Relaxation can take place equally in both directions (MD and TD) or in a different way (quantitative extend) in one or the other direction.

Furthermore, relaxation is also possible in only one direction, i.e. only in MD or TD. The choice of the relaxation direction can always be made independently of each other. In the context of the present invention, the quantitative extend of the relaxation is expressed by the so-called relaxation factor, as defined in more detail below.

But even relaxation of the film alone does not sufficiently reduce shrinkage, and in no case can shrinkage even be completely eliminated.

This is due to the fact that the films (shrink films/lidding films) are conventionally treated or fixed only at temperatures of max. up to 60 to 80° C. during relaxation, since these relatively low temperatures are already sufficient to achieve controlled shrinkback of the films and to reduce the remaining shrinkage to values by around 10 to 20%, respectively in MD and TD, but at best to $>5$ to 10% in one of the two directions.

Lower shrinkage values have not been achievable so far, since neither the relaxation achievable at these conditions (temperatures) nor the applied temperature are sufficient to reduce the shrinkage to below 5%, respectively in MD and TD.

The level of relaxation that can be realized depends essentially on the level of temperature at which the film is treated or fixed.

Thus, the highest possible relaxation, which has a further positive effect on the remaining residual shrinkage, i.e. further reduces the residual shrinkage, can only be achieved with correspondingly high temperatures in the film treatment (thermo fixing).

In this case, however, the same problem arises again as described previously, namely that when treating films, in particular films containing combinations of raw materials with widely differing melting temperatures, with the temperatures required to eliminate the shrinkage, softening or even melting of individual layers occurs and thus inevitably interrupts, or at least massively impairs, the producing process of the film.

When the film is treated with a combination of temperature and relaxation, the temperature range at which the producing process is impaired or interrupted, again depends on the mass proportion of the materials (density $>1.00$ g/cm$^3$) in the layer structure of the film.

Surprisingly, however, the proportion of materials (density $>1.00$ g/cm$^3$) contained in the film can be significantly lower with appropriate relaxation than with exclusive heat treatment without relaxation.

Thus, with appropriate relaxation, treatment at significantly higher temperatures, in any case above 60° C., preferably above 70° C., in particular above 80° C., up to temperatures of 180° C., preferably up to 150° C., in particular up to 120° C., can be applied, with simultaneous reduction of the materials (thermoplastic resin with a density $>1.00$ g/cm$^3$) to a mass proportion in any case of below 40%, preferably below 30%, in particular below 20%, down to a mass proportion of even less than 10%, relative to the total mass of the layer structure of the film. In this case, the mass proportion of the thermoplastic resin with a density $>1.00$ g/cm$^3$ relative to the total mass of the layer structure of the film is at least 1%, preferably at least 5%.

In the method according to the invention, therefore, the temperature of the composite film during relaxation is preferably adjusted or set to one of the following ranges: 60 to 180° C., preferably 60 to 150° C., particularly preferably 60 to 120° C., most preferably 80 to 100° C.

It is essential for the method according to the invention that the sum of the relaxation factor in the machine direction (MD) and the relaxation factor in the transverse direction (TD) is at least 0.05 (=5%), preferably at least 0.1 (=10%), preferably at least 0.2 (=20%), in particular at least 0.4 (=40%). Therein, the relaxation factor in the machine direction and the relaxation factor in the transverse direction are each at least greater than 0.00.

Consequently, the relaxation factors, in addition to the introduced fixing temperature (temperature of the composite film during relaxation), are decisive factors for reducing or eliminating again the shrinkage introduced during stretching of the film.

In the context of the present invention, it has thus proven to be expedient to reduce or relax again in a controlled manner the stretching or elongation of the film introduced during stretching.

If the sum of the process steps, including stretching and subsequent relaxation, is considered, a residual stretch or residual elongation is obtained in the film after both process steps. A residual stretch factor can be determined, which is defined in detail in the following and which is based on the ratio of a length of a section of the composite film after stretching and after relaxation to a length of the same section before stretching and before relaxation.

Since the residual stretch factor results equally from both processes (stretching and relaxation), it can ideally also be influenced or changed equally by both processes.

A closer look at this dependence reveals that even a reduction of the stretch factor under otherwise identical conditions results in an effect similar to a later relaxation of the film, i.e., with lower stretching a very low shrinkage can be achieved even with lower relaxation, and with high stretching a high relaxation is again required to keep the shrinkage low, but surprisingly, basically the influence of the relaxation factor is significantly higher than that of the stretch factor.

Nevertheless, it is not the relaxation alone, but rather the sum or factor of both process steps that is decisive.

Thus, the residual stretch factor and, of course, the temperature introduced in the relaxation essentially determine whether and how much shrinkage remains in the film.

Since not only the relaxation process and the temperature introduced in it, but also the stretching process have a significant influence on the residual shrinkage remaining, and the stretching process is also subject to temperature treatment, the influence from this must also be considered.

In fact, an influence can also be seen here, i.e. at low stretching temperatures, without a simultaneous change in other process parameters, there is a higher residual shrinkage than compared with higher stretching temperatures.

Compared to relaxation, however, the stretching process is much more sensitive, i.e. the temperatures required to obtain a stable process at all are often within a temperature window of only +/−2 to +/−3° C. Therefore, the temperature range to be varied is smaller or limited in this case.

In addition, the influence of the temperature of the composite film during stretching is rather small according to the knowledge of the inventors.

The temperature during stretching of the composite film is thus an influencing factor, but not of the same decisive importance as the temperature in the relaxation or else the stretch factor as well as the relaxation factor or the residual stretch factor.

A closer look at the process steps and their influence reveals another significant factor, namely the time or duration for which the film is exposed to the individual process steps and the prevailing conditions.

However, it turns out that the influence of the time factor in the stretching process is rather negligible compared to the influence of the temperature and the stretch factor.

In contrast, it turns out that in the relaxation process, the time (duration) of the relaxation can be of at least equal importance as the relaxation factor and the prevailing temperature.

It turns out that the interaction of time (duration) and relaxation factor is less significant than the time (duration) in connection with the temperature, i.e. more precisely, the duration to which the film is exposed to the temperature during relaxation.

The longer the duration of the temperature treatment, the greater the influence and thus the reduction in residual shrinkage.

However, it also becomes apparent that this cannot be increased indefinitely, but rather that after a certain duration under the influence of temperature, no further increase. i.e. shrinkage reduction, can be realized and a kind of saturation sets in.

Much more decisive, however, is the duration for which the film is at least at a minimum under the influence of temperature, so here a duration or dwell time under temperature of at least 2 seconds is required in order to recognize a desired influence.

Thus, the method according to the invention may be limited in that the composite film has a temperature in one of the aforementioned temperature ranges for a predetermined period of time during relaxation (a so-called "dwell time under temperature"). Thus, a duration of relaxation or a dwell time during relaxation under temperature must preferably be at least 2 seconds, in particular more than 5 seconds. Thereby, the duration of the relaxation or the dwell time during the relaxation under temperature may be limited to at most 30 seconds, preferably at most 20 seconds, in particular at most 10 seconds.

Just as the temperature or the relaxation alone cannot bring about a correspondingly low shrinkage, the dwell time under temperature alone cannot do so. These influencing variables and the effect they achieve are interdependent and influence each other.

Thus, the residual shrinkage of the film is low at high temperature treatment and simultaneous high relaxation despite short dwell time under temperature.

However, the residual shrinkage of the film is also low with high temperature treatment and long dwell time under temperature despite low relaxation.

The remaining residual shrinkage of the film is also low with long dwell time under temperature and high relaxation despite moderate temperature treatment.

It is therefore only the combination of these influencing variables that makes it possible to achieve the desired low residual shrinkage of the film.

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| Films according to the invention ||||||||||

FILM 1: PET(15%)/HV/PE/HV/PA(20%)/EVOH(5%)/PA(20%)/HV/PE; Percentages by mass of the total mass of the composite film; proportion of material with a density > 1.0 g/cm³ > 50%; fixing temperature = temperature of the composite film during relaxation

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| 3.4 × 2.6 | 5 × 1 | ↓ | 3.23 × 2.57 | 120 | → | 5 | → | 19 × 17 |
| 3.4 × 2.6 | 40 × 20 | ↑ | 2.04 × 2.08 | 120 | → | 5 | → | 0 × 0.5 |
| 3.4 × 2.6 | 20 × 5 | → | 2.72 × 2.47 | 60 | ↓ | 5 | → | 17 × 14 |
| 3.4 × 2.6 | 20 × 5 | → | 2.72 × 2.47 | 180 | ↑ | 5 | → | No stable process |
| 3.4 × 2.6 | 20 × 5 | → | 2.72 × 2.47 | 120 | → | 2 | ↓ | 9 × 8 |
| 3.4 × 2.6 | 20 × 5 | → | 2.72 × 2.47 | 120 | → | 9 | ↑ | 0.5 × 0.5 |
| 3.4 × 2.6 | 5 × 1 | ↓ | 3.23 × 2.57 | 60 | ↓ | 2 | ↓ | 46 × 42 |
| 3.4 × 2.6 | 20 × 5 | → | 2.72 × 2.47 | 120 | → | 5 | → | 2 × 1 |
| 3.4 × 2.6 | 40 × 20 | ↑ | 2.04 × 2.08 | 180 | ↑ | 9 | ↑ | 0 × 0 |

Film 2: PET(10%)/HV/PE/HV/PA(10%)/EVOH(5%)/PA(10%)/HV/PE; Percentages by mass of the total mass of the composite film; material with a density > 1.0 g/cm³ < 40%; fixing temperature = temperature of the composite film during relaxation

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| 3.4 × 2.6 | 5 × 1 | ↓ | 3.23 × 2.57 | 100 | → | 5 | → | 17 × 18 |
| 3.4 × 2.6 | 40 × 20 | ↑ | 2.04 × 2.08 | 100 | → | 5 | → | 0.5 × 0.5 |
| 3.4 × 2.6 | 20 × 5 | → | 2.72 × 2.47 | 60 | ↓ | 5 | → | 15 × 14 |
| 3.4 × 2.6 | 20 × 5 | → | 2.72 × 2.47 | 150 | ↑ | 5 | → | No stable process |
| 3.4 × 2.6 | 20 × 5 | → | 2.72 × 2.47 | 100 | → | 2 | ↓ | 8 × 8 |
| 3.4 × 2.6 | 20 × 5 | → | 2.72 × 2.47 | 100 | → | 9 | ↑ | 0.5 × 1 |
| 3.4 × 2.6 | 5 × 1 | ↓ | 3.23 × 2.57 | 60 | ↓ | 2 | ↓ | 43 × 41 |
| 3.4 × 2.6 | 20 × 5 | → | 2.72 × 2.47 | 100 | → | 5 | → | 1.5 × 2 |
| 3.4 × 2.6 | 40 × 20 | ↑ | 2.04 × 2.08 | 150 | ↑ | 9 | ↑ | 0 × 0 |

Film 3: PA(10%)/HV/PP/HV/EVOH(5%)/HV/PE; Percentages by mass of the total mass of the composite film; material with a density > 1.0 g/cm³ < 20%; fixing temperature = temperature of the composite film during relaxation

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| 3.5 × 2.8 | 5 × 1 | ↓ | 3.33 × 2.77 | 90 | → | 5 | → | 21 × 24 |
| 3.5 × 2.8 | 40 × 20 | ↑ | 2.1 × 2.24 | 90 | → | 5 | → | 0.5 × 1 |
| 3.5 × 2.8 | 20 × 5 | → | 2.8 × 2.66 | 60 | ↓ | 5 | → | 19 × 22 |
| 3.5 × 2.8 | 20 × 5 | → | 2.8 × 2.66 | 120 | ↑ | 5 | → | kein stabiler Prozess |
| 3.5 × 2.8 | 20 × 5 | → | 2.8 × 2.66 | 90 | → | 2 | ↓ | 9 × 11 |
| 3.5 × 2.8 | 20 × 5 | → | 2.8 × 2.66 | 90 | → | 9 | ↑ | 1 × 1.5 |
| 3.5 × 2.8 | 5 × 1 | ↓ | 3.33 × 2.77 | 60 | ↓ | 2 | ↓ | 45 × 47 |
| 3.5 × 2.8 | 20 × 5 | → | 2.8 × 2.66 | 90 | → | 5 | → | 2 × 2.5 |
| 3.5 × 2.8 | 40 × 20 | ↑ | 2.1 × 2.24 | 120 | ↑ | 9 | ↑ | 0 × 0 |

Film 4: PET(5%)/HV/PE/HV/EVOH(5%)/HV/PE; Percentages by mass of the total mass of the composite film; material with a density > 1.0 g/cm³ ≤ 10%; fixing temperature = temperature of the composite film during relaxation

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| 3.5 × 3.0 | 5 × 1 | ↓ | 3.33 × 2.97 | 75 | → | 5 | → | 37 × 34 |
| 3.5 × 3.0 | 40 × 20 | ↑ | 2.1 × 2.4 | 75 | → | 5 | → | 1 × 1.5 |
| 3.5 × 3.0 | 20 × 5 | → | 2.8 × 2.85 | 60 | ↓ | 5 | → | 24 × 27 |
| 3.5 × 3.0 | 20 × 5 | → | 2.8 × 2.85 | 90 | ↑ | 5 | → | kein stabiler Prozess |
| 3.5 × 3.0 | 20 × 5 | → | 2.8 × 2.85 | 75 | → | 2 | ↓ | 12 × 14 |
| 3.5 × 3.0 | 20 × 5 | → | 2.8 × 2.85 | 75 | → | 9 | ↑ | 2 × 2.5 |
| 3.5 × 3.0 | 5 × 1 | ↓ | 3.33 × 2.97 | 60 | ↓ | 2 | ↓ | 54 × 51 |
| 3.5 × 3.0 | 20 × 5 | → | 2.8 × 2.85 | 75 | → | 5 | → | 3 × 4 |
| 3.5 × 3.0 | 40 × 20 | ↑ | 2.1 × 2.4 | 90 | ↑ | 9 | ↑ | 0 × 0 |

Film 5: PP/HV/EVOH(5%)/HV/PE; Percentages by mass of the total mass of the composite film; material with a density > 1.0 g/cm³ ≤ 5%; fixing temperature = temperature of the composite film during relaxation

| Stretch factor (TD × MD) | Relaxation factor (TD × MD) (%) | Level of relaxation | Residual stretch factor (TD × MD) | Fixing temperature (° C.) | Level of fixing temperature | Dwell time during relaxation (sec) | Duration of dwell time | Shrinkage after stretching and relaxation (TD × MD) (%) |
|---|---|---|---|---|---|---|---|---|
| 5.0 × 5.0 | 5 × 1 | ↓ | 4.75 × 4.95 | 70 | → | 5 | → | kein stabiler Prozess |
| 5.0 × 5.0 | 40 × 20 | ↑ | 3.0 × 4.0 | 70 | → | 5 | → | 9 × 11 |
| 5.0 × 5.0 | 20 × 5 | → | 4.0 × 4.75 | 60 | ↓ | 5 | → | 31 × 34 |
| 5.0 × 5.0 | 20 × 5 | → | 4.0 × 4.75 | 80 | ↑ | 5 | → | kein stabiler Prozess |
| 5.0 × 5.0 | 20 × 5 | → | 4.0 × 4.75 | 70 | → | 2 | ↓ | 28 × 29 |
| 5.0 × 5.0 | 20 × 5 | → | 4.0 × 4.75 | 70 | → | 9 | ↑ | kein stabiler Prozess |
| 5.0 × 5.0 | 5 × 1 | ↓ | 4.75 × 4.95 | 60 | ↓ | 2 | ↓ | 37 × 39 |
| 5.0 × 5.0 | 20 × 5 | → | 4.0 × 4.75 | 70 | → | 5 | → | 23 × 24 |
| 5.0 × 5.0 | 40 × 20 | ↑ | 3.0 × 4.0 | 80 | ↑ | 9 | ↑ | kein stabiler Prozess |

Thus, in order to solve the defined object, in addition to the ideally applied layer structure with the raw materials preferably contained therein, the combination with the temperatures, process factors, and here in particular the stretch factor, the relaxation factor and the residual stretch factor, as well as the dwell time, at least the duration of the thermal fixation (relaxation), applied in the individual process steps, are of decisive importance. The combination of the features and parameters mentioned above or defined in the independent claims according to the invention has for the first time achieved the goal of producing, and in particular stably producing, a generic composite film by means of coextrusion and without lamination, which, in addition to the properties to be aimed for, such as thermal resistance, printability and oxygen barrier, also has no shrinkage or a shrinkage of less than 5%, preferably less than 3%, in the MD and TD, respectively.

It is particularly preferred if the thermoplastic resin contained in the layer (c) or of which the layer (c) consists has a melting temperature of less than 120° C. The increased temperature difference compared to the melting temperature of the outermost layer means that the composite film can be sealed earlier, i.e., already at a lower temperature. In addition, higher numbers of cycles can be achieved during further processing of the composite film.

It is also particularly preferred if the thermoplastic resin contained in the layer (a) or of which the layer (a) consists has a melting temperature of more than 170° C. Due to the higher temperature of the outermost layer, higher temperatures can be used in further processing and thus, higher numbers of cycles can be achieved in further processing of the composite film.

Furthermore, according to the invention, the layer (a), i.e. the outermost layer, or the thermoplastic resin of the layer (a) can advantageously have a predetermined polarity, which is represented in the shape of the surface tension, given in the unit dyn/cm (dynes per centimeter, a dyne is equal to $10^{-5}$ N). This value can preferably be >40 dyn/cm, in particular >42 dyn/cm, to enable the best possible printability.

According to the invention, it can further be provided in an advantageous embodiment that the outermost layer (a) consists of or contains EVOH.

To date, no generic composite film is known from the state of the art in which EVOH has been used as a layer component in the outermost layer (a), or in which the layer (a) would consist of EVOH. Thus, the use of EVOH as a material with an excellent oxygen barrier is known from the state of the art. However, a use for this purpose requires an intermediate layer arrangement of EVOH, since EVOH quickly loses its good oxygen barrier properties due to moisture penetration. Therefore, EVOH has only ever been used as a layer component or layer material surrounded or sandwiched on both sides by protective layers, such as polyolefin or polyamide, some of which have a high water vapor barrier. However, the use of EVOH in generic composite films for a different purpose and in a different way or in a different disposition, for example as an outermost or sealant layer (innermost layer; surface to the good to be packaged), has not been known so far.

In contrast, according to the invention, the possibility of deliberately using EVOH in layer (a), i.e. in the outermost layer constituting a surface of the composite film to the outside, is provided. In this context, the outermost layer (a) may contain EVOH or consist thereof. However, when EVOH is provided in the outermost layer (a), the property of EVOH as an oxygen barrier does not play a role. Rather, what matters according to the invention is that the use of EVOH in the outermost layer substantially increases the recyclability of the film compared to composite films that have outermost layers with PA or PET. This is because the EVOH has a lower melting temperature compared to the PA and PET materials previously provided in the outermost layer, so that the difference in the melting temperatures of the outermost layer and the sealant layer (innermost layer) is reduced. Thereby, the overall melting temperature required for recycling can be reduced, which improves the recyclability of the composite film.

In addition, the inventors have found that the EVOH in the outermost layer can further improve the mechanical properties, such as stiffness and printability, of the film similar to PET or PA compared to polyolefins, such as PE or PP. For example, the higher melting temperature of the EVOH compared to these polyolefins and the associated greater temperature resistance to the innermost layer (sealant layer) leads to an overall improvement in the further processability of the composite film (number of cycles).

The following subject-matter is also disclosed within the scope of this application. The above defined object is solved by the subject-matter defined according to the following numbers.

1. Method for producing a multilayered composite film, wherein the method includes at least the following steps:
    a step of coextruding at least three layers (a), (b) and (c) of which
        the layer (a) forms an outward surface of the composite film;
        the layer (c) forms a surface of the composite film facing or coming in contact with a good to be packaged: and
        the layer (b) is disposed between the layer (a) and the layer (c);
        wherein the layer (b) consists of a single layer or a plurality of layers (b1, b2, b3, b4, . . . ), preferably two, three or four layers;
    a step of stretching the coextruded composite film; and
    a step of relaxing the stretched/oriented composite film:
    wherein the stretching is bi-axial;
    wherein a stretch factor in the machine direction or longitudinal direction (MD) is at least 2.0;
    wherein a stretch factor in the transversal direction (TD) is at least 2.0;
    wherein the sum of the stretch factor in the machine direction (MD) and the stretch factor in the transversal direction (TD) is at least 5.0;
    wherein the composite film has a temperature of 70 to 130° C. during stretching;
    wherein a relaxation factor in the machine direction (MD) is more than 0.00;
    wherein a relaxation factor in the transversal direction (TD) is more than 0.00;
    wherein the sum of the relaxation factor in the machine direction (MD) and the relaxation factor in the transversal direction (TD) is at least 0.05 (=5%), preferably at least 0.1 (=10%), preferably at least 0.2 (=20%), in particular at least 0.4 (=40%);
    wherein the composite film has a temperature of 660 to 180° C., preferably 60 to 150° C., more preferably 60 to 120° C., in particular preferably 80 to 100° C., during relaxation;
    wherein a dwell time during relaxation, preferably during relaxation under temperature, is preferably at least 2 seconds, in particular more than 5 seconds, or the duration of relaxation is preferably at least 2 seconds, in particular more than 5 seconds;
    wherein a dwell time during relaxation, preferably during relaxation under temperature, is preferably at most 30 seconds, preferably at most 20 seconds, in particular at most 10 seconds, or the duration of relaxation is preferably at most 30 seconds, preferably at most 20 seconds, in particular at most 10 seconds:
    wherein a residual stretch factor in the machine direction (MD) is at most 5.0;
    wherein a residual stretch factor in the transversal direction (TD) is at most 5.0:
    wherein the layer (a) comprises or consists of a thermoplastic resin having a density of greater than 1.0) g/cm³;

wherein the layer (b) or the plurality of the layers (b1, b2, . . . ) each comprises or consists of a thermoplastic resin having a density of greater than 1.00 g/cm³; and wherein the layer (c) comprises or consists of a thermoplastic resin having a density of less than 0.95 g/cm³.

2. Method for producing a multilayered composite film, preferably method according to number 1, wherein the method includes at least the following steps:

a step of coextruding at least four layers (a), (b), (d), and (c) of which
   the layer (a) forms an outward surface of the composite film
   the layer (c) forms a surface of the composite film facing or coming in contact with a good to be packaged; and
   the layer (b) is disposed between the layer (a) and the layer (c);
   the layer (d) is disposed between the layer (a) and the layer (c), preferably between the layer (a) and the layer (b);

wherein the layer (b) consists of a single layer or a plurality of layers (b1, b2, . . . ), preferably two, three or four layers;

wherein the layer (d) consists of a single layer or a plurality of layers (d1, d2, . . . ), preferably two, three or four layers;

a step of stretching the coextruded composite film; and a step of relaxing the stretched/oriented composite film;

wherein the stretching is bi-axial;

wherein a stretch factor in the machine direction or longitudinal direction (MD) is at least 2.0;

wherein a stretch factor in the transversal direction (TD) is at least 2.0;

wherein the sum of the stretch factor in the machine direction (MD) and the stretch factor in the transversal direction (TD) is at least 5.0;

wherein the composite film has a temperature of 70 to 130° C. during stretching;

wherein a relaxation factor in the machine direction (MD) is more than 0.00;

wherein a relaxation factor in the transversal direction (TD) is more than 0.00;

wherein the sum of the relaxation factor in the machine direction (MD) and of the relaxation factor in the transversal direction (TD) is at least 0.05 (=5%), preferably at least 0.1 (=10%), preferably at least 0.2 (=20%), in particular at least 0.4 (=40%);

wherein the composite film has a temperature of 60 to 180° C., preferably 60 to 150° C., more preferably 60 to 120° C. in particular preferably 80 to 100° C., during relaxation;

wherein a dwell time during relaxation, preferably during relaxation under temperature, is preferably at least 2 seconds, in particular more than 5 seconds, or the duration of relaxation is preferably at least 2 seconds, in particular more than 5 seconds;

wherein a dwell time during relaxation, preferably during relaxation under temperature, is preferably at most 30 seconds, preferably at most 20 seconds, in particular at most 10 seconds, or the duration of relaxation is preferably at most 30 seconds, preferably at most 20 seconds, in particular at most 10 seconds;

wherein a residual stretch factor in the machine direction (MD) is at most 5.0;

wherein a residual stretch factor in the transversal direction (TD) is at most 5.0;

wherein the layer (a) comprises or consists of a thermoplastic resin having a density of greater than 1.00 g/cm³;

wherein the layer (d) or the plurality of the layers (d1, d2, . . . ) each comprises or consists of a thermoplastic resin, preferably a polyolefin, having a density of less than 1.00 g/cm³, preferably less than 0.98 g/cm³;

wherein the layer (b) or the plurality of the layers (b1, b2, . . . ) each comprises or consists of a thermoplastic resin having a density of greater than 1.0) g/cm³; and wherein the layer (c) comprises or consists of a thermoplastic resin having a density of less than 0.95 g/cm³.

3. Method according to number 1 or 2 above, characterized in that
   the thermoplastic resin of the layer (a) and the thermoplastic resin of the layer (b) are different; or
   the thermoplastic resin of the layer (a) is different from the thermoplastic resin of the layer (b) or from all thermoplastic resins of the layers (b1, b2, . . . ); or
   the thermoplastic resin of the layer (a) and the thermoplastic resin of the layer (b) are identical; or
   the thermoplastic resin of the layer (a) is identical to at least one of the thermoplastic resins of the layers (b1, b2, . . . ).

4. Method according to any one of numbers 1 to 3 above, characterized in that
   the thermoplastic resin of the layer (a) has a melting temperature of more than 170° C.; and/or
   the thermoplastic resin of the layer (a) has a surface tension >40 dyn/cm, in particular >42 dyn/cm.

5. Method according to any one of numbers 1 to 4 above, characterized in that
   the thermoplastic resin of the layer (c) is a polyolefin having a sealing temperature lower than the sealing temperature of the thermoplastic resin of the layer (a); and/or
   the thermoplastic resin of the layer (c) is a polyolefin having a melting temperature of less than 120° C.

6. Method according to any one of numbers 1 to 5 above, characterized in that
   the thermoplastic resin of the layer (b) has an oxygen permeability of less than 100 cm³/m²·d·bar or the thermoplastic resins of the layers (b1, b2, . . . ) each or in total have an oxygen permeability of less than 100 cm³/m²·d·bar; and/or
   the layer (b) has an oxygen permeability of less than 100 cm³/m²·d·bar or the layers (b1, b2, . . . ) each or in total have an oxygen permeability of less than 100 cm³/m²·d·bar.

7. Method according to any one of numbers 1 to 6 above, characterized in that
   the stretching is carried out simultaneously or successively in several stages.

8. Method according to any one of numbers 1 to 7 above, characterized in that
   the composite film after stretching and relaxation has a shrinkage of less than 0.05 (=5%), preferably less than 0.03 (=3%), in the machine direction (MD); and/or
   the composite film after stretching and relaxation has a shrinkage of less than 0.05 (=5%), preferably less than 0.03 (=3%), in the transversal direction (TD); and/or
   the composite film after stretching and relaxation preferably has a sum of the shrinkage in the machine direction (MD) and the shrinkage in the transversal direction (TD)(=total shrinkage) of less than 0.05 (=5%).
9. Method according to any one of numbers 1 to 8 above, characterized in that
   the thickness of the layer (a) does not exceed 20%, preferably 10%, of the thickness of the entire composite film; and/or
   the thickness of the layer (b) or the total thickness of the layers (b1, b2, . . . ) does not exceed 20%, preferably 10%, of the thickness of the entire composite film.
10. Method according to any one of numbers 1 to 9 above, characterized in that
    the mass proportion of the layer (a) relative to the total mass of the composite film does not exceed 10%; and/or
    the mass proportion of the layer (b) or the sum of the mass proportions of the layers (b1, b2, . . . ) relative to the total mass of the composite film does not exceed 10%.
11. Method according to any one of numbers 1 to 10 above, characterized in that
    the sum of the mass proportions of the layer (a) and (b) or of the layer (a) and the layers (b1, b2, . . . ) relative to the total mass of the composite film does not exceed 10%.
12. Method according to any one of numbers 1 to 11 above, characterized in that
    the thermoplastic resin of the layer (a) contains or consists of a polyester, preferably a polyethylene terephthalate (PET) or a polylactic acid or a polylactide (PLA), a polyamide (PA), an ethylene-vinyl alcohol copolymer (EVOH), or any mixture thereof.
13. Method according to any one of numbers 1 to 12 above, characterized in that
    the thermoplastic resin of the layer (c) comprises or consists of a polyolefin (PO), preferably a polyethylene (PE) and/or a polypropylene (PP), an ethylene-vinyl acetate copolymer (EVA), an ionomer (IO), an ethylene-methyl methacrylate copolymer (EMMA), an ethylene-methacrylic acid copolymer (EMA), or any mixture thereof.
14. Multilayered composite film, produced according to any one of numbers 1 to 13 above,
    wherein the composite film is preferably sheet-like or tubular.
15. Multilayered, coextruded, biaxially stretchedloriented, and relaxed composite film, preferably produced by the method according to any one ofnumbers 1 to 13 above, comprising at least three layers (a), (b) and (c), of which
    the layer (a) forms an outward surface of the composite film;
    the layer (c) forming a surface of the composite film facing or coming in contact with a good to be packaged: and
    the layer (b) is disposed between the layer (a) and the layer (c);
    wherein the layer (b) consists of a single layer or a plurality of layers (b1, b2, b3, b4, . . . ), preferably two, three or four layers;
    wherein a residual stretch factor of the composite film in the machine direction (MD) is at most 5.0;
    wherein a residual stretch factor of the composite film in the transversal direction (TD) is at most 5.0;
    wherein the layer (a) comprises or consists of a thermoplastic resin having a density of greater than 1.00 g/cm$^3$;
    wherein the layer (b) or the plurality of the layers (b1, b2, . . . ) each comprises or consists of a thermoplastic resin having a density of greater than 1.00 g/cm$^3$; and
    wherein the layer (c) comprises or consists of a thermoplastic resin having a density of less than 0.95 g/cm$^3$.
16. Multilayered, coextruded, biaxially stretched, and relaxed composite film, preferably composite film according to number 15 above, comprising at least four layers (a), (b), (d) and (c), of which
    the layer (a) forms an outward surface of the composite film;
    the layer (c) forms a surface of the composite film facing or coming in contact with a good to be packaged; and
    the layer (b) is disposed between the layer (a) and the layer (c);
    the layer (d) is disposed between the layer (a) and the layer (c), preferably between the layer (a) and the layer (b);
    wherein the layer (b) consists of a single layer or a plurality of layers (b1, b2, . . . ), preferably two, three or four layers;
    wherein the layer (d) consists of a single layer or a plurality of layers (d1, d2, . . . ), preferably two, three or four layers;
    wherein a residual stretch factor of the composite film in the machine direction (MD) is at most 5.0;
    wherein a residual stretch factor of the composite film in the transversal direction (TD) is at most 5.0;
    wherein the layer (a) comprises or consists of a thermoplastic resin having a density of greater than 1.00 g/cm$^3$;
    wherein the layer (d) or the plurality of the layers (d1, d2, . . . ) each comprises or consists of a thermoplastic resin, preferably a polyolefin, having a density of less than 1.00 g/cm$^3$, preferably less than 0.98 g/cm$^3$;
    wherein the layer (b) or the plurality of the layers (b1, b2, . . . ) each comprises or consists of a thermoplastic resin having a density of greater than 1.00 g/cm$^3$; and
    wherein the layer (c) comprises or consists of a thermoplastic resin having a density of less than 0.95 g/cm$^3$.
17. Composite film according to any of numbers 14 to 16 above, characterized in that
    the thermoplastic resin of the layer (a) and the thermoplastic resin of the layer (b) are different; or the thermoplastic resin of the layer (a) is different from the thermoplastic resin of the layer (b) or from all thermoplastic resins of the layers (b1, b2, . . . ); or
the thermoplastic resin of the layer (a) and the thermoplastic resin of the layer (b) are identical; or
the thermoplastic resin of the layer (a) is identical to at least one of the thermoplastic resins of the layers (b1, b2, . . . ).

18. Composite film according to any of numbers 14 to 17 above, characterized in that
    the thermoplastic resin of the layer (a) has a melting temperature of more than 170° C.
19. Composite film according to any of numbers 14 to 18 above, characterized in that
    the thermoplastic resin of the layer (c) is a polyolefin having a sealing temperature lower than the sealing temperature of the thermoplastic resin of the layer (a); and/or
    the thermoplastic resin of the layer (c) is a polyolefin having a melting temperature of less than 120° C.
20. Composite film according to any of numbers 14 to 19 above, characterized in that
    the thermoplastic resin of the layer (b) or the thermoplastic resins of the layers (b1, b2, . . . ) each or in total has or have an oxygen permeability of less than 100 cm$^3$/m$^2$·d·bar; and/or
    the layer (b) or the layers (b1, b2, . . . ) each or in total has or have an oxygen permeability of less than 100 cm$^3$/m$^2$·d·bar.
21. Composite film according to any of numbers 14 to 20 above, characterized in that
    the composite film after stretching and relaxation has a shrinkage of less than 0.05 (=5%), preferably less than 0.03 (=3%), in the machine direction (MD); and/or
    the composite film after stretching and relaxation has a shrinkage of less than 0.05 (=5%), preferably less than 0.03 (=3%), in the transversal direction (TD); and/or
    the composite film after stretching and relaxation preferably has a sum of the shrinkage in the machine direction (MD) and the shrinkage in the transversal direction (TD)(=total shrinkage) of less than 0.05 (=5%).
22. Composite film according to any of numbers 14 to 21 above, characterized in that
    the thickness of the layer (a) does not exceed 20%, preferably 10%, of the thickness of the entire composite film; and/or
    the thickness of the layer (b) or the total thickness of the layers (b1, b2, . . . ) does not exceed 20%, preferably 10%, of the thickness of the entire composite film.
23. Composite film according to any of numbers 14 to 22 above, characterized in that
    the mass proportion of the layer (a) relative to the total mass of the composite film does not exceed 10%; and/or
    the mass proportion of the layer (b) or the sum of the mass proportions of the layers (b1, b2, . . . ) relative to the total mass of the composite film does not exceed 10%.
24. Composite film according to any of numbers 14 to 23 above, characterized in that
    the sum of the mass proportions of the layer (a) and layer (b) or of the layer (a) and (b1, b2, . . . ) relative to the total mass of the composite film does not exceed 10%.
25. Composite film according to any of numbers 14 to 24 above, characterized in that
    the thermoplastic resin of the layer (a) contains or consists of a polyester, preferably a polyethylene terephthalate (PET) or a polylactic acid or a polylactide (PLA), a polyamide (PA), an ethylene-vinyl alcohol copolymer (EVOH), or any mixture thereof.
26. Composite film according to any of numbers 14 to 25 above, characterized in that
    the thermoplastic resin of the layer (c) comprises or consists of a polyolefin (PO), preferably a polyethylene (PE) and/or a polypropylene (PP), an ethylene-vinyl acetate copolymer (EVA), an ionomer (IO), an ethylene-methyl methacrylate copolymer (EMMA), an ethylene-methacrylic acid copolymer (EMA), or any mixture thereof.
27. Use of a multilayered composite film according to any one of numbers 14 to 26 above or of a casing made therefrom for packaging a good, preferably for packaging a food product, a luxury food product or a liquid or solid, in particular powdered, good.
28. Method according to any one of numbers 1 to 13, composite film according to any one of numbers 14 to 26 or use according to number 27, characterized in that
    the mass proportion of the layer components having a melting temperature of more than 170° C., preferably of the thermoplastic resin of the layer (a) having a melting temperature of more than 170° C. is 1 to <40%, preferably 1 to <30%, preferably 1 to <20%, in particular 5 to <20%, relative to the total mass of the composite film.

Supplementary Disclosure and Definitions

The method for manufacturing a multilayered composite film according to the invention described herein may be characterized in that it does not comprise a step of laminating, i.e., bonding or conglutination, layers or layer composites.

Accordingly, the multilayered composite film described herein according to the invention may be a non-laminated composite film.

Length definitions (each based on the machine direction or the transversal direction):
L0:=length of a predetermined section of the composite film before stretching;
L1:=length of the same section of composite film after stretching and before relaxation:
L2:=length of the same section of composite film after stretching and before relaxation:
L3:=length of the same section of composite film after stretching and after relaxation;
Stretch factor definition: stretch factor V=length L1 of a predetermined section of the composite film after stretching and before relaxation divided by the length L0 of the same section of the composite film before stretching. (V:=L1/L0).
Definition of relaxation factor: relaxation factor RL=amount of difference of (the length L3 of a predetermined section of the composite film after stretching and after relaxation and the length L2 of the same section of the composite film after stretching and before relaxation) divided by the length L2 of the same section of the composite film after stretching and before relaxation; (RL=|(L3−L2)|/L2)
Definition of residual stretch factor: residual stretch factor RV=length L3 of a predetermined section of the composite film after stretching and after relaxation divided by the length L0 of the same section of the composite film before stretching and before relaxation; (RV=L3/L0))

Preferably, the composite film according to the invention is a multilayered composite film with barrier function or a multilayer barrier film, wherein the barrier property refers to reduced oxygen permeability or reduced water vapor permeability or both.

Shrinkage (or heat shrinkage): measured in water at 90° C., preferably within 1 second after immersion, but at least within 10 seconds after immersion.

According to the invention, in order to determine the shrinkage (or hot shrinkage), the sample is immersed in water at 90° C. for a predetermined period of time, in particular the aforementioned period of time, and immediately cooled to room temperature with water after removal. The length of a pre-marked section after this treatment is measured, and reference is made to measured length of the same section of the sample before treatment. The resulting length ratio ("shrunk" to "unshrunk"), given as a percentage, defines the shrinkage or shrink. Depending on the direction of the length measurement, the shrinkage is obtained in the longitudinal (MD) and transverse (TD) directions. The total shrinkage is calculated by adding the shrinkage in the longitudinal and transversal directions. Multiple determinations, such as triplicate or quintuplicate determinations, of the length measurements, and the formation of the corresponding average values therefrom, advantageously increase the accuracy of the determination. According to the invention, the shrinkage and the total shrinkage can be determined, in particular according to ASTM 2732.

According to the invention, oxygen permeability is measured at 23° C. and 75% relative humidity (ASTMD 1434).

The method according to the invention and the composite film according to the invention can preferably be carried out or manufactured using the so-called double-bubble and in particular the triple-bubble method, for which the applicant provides suitable equipment, which is known to the skilled person. Therein, the multilayered composite film can be coextruded from the respective resin melts, for example, by means of a nozzle blow head of the applicant set up for manufacturing composite films with three or more layers, preferably with thermal separation of the individual layers, cooled with a water cooling system of the applicant, reheated, biaxially stretched/oriented (in the machine direction (MD) and in the transversal direction (TD)) by means of an enclosed compressed air bubble and finally relaxed (=heat-set or thermofixed) in a further step in a defined temperature regime. The composite film according to the invention can be a composite film which comprises a barrier against gas diffusion, in particular oxygen diffusion, and/or against water vapor diffusion. Such a manufacturing process is also known to the skilled person from the textbook by Savic, Z., Savic, I., "Sausage Casings", 1st edition, 2002, VICTUS Lebensmittelindustriebedarf Vertriebsgesellshaft m.b.H., Vienna, Austria, chapter 7, esp. subchapter 4.2, pages 267 to 270.

Another way of manufacturing the film according to the invention is by stretching/orienting a coextruded flat film according to the tenter-frame method known to the skilled person.

The composite film of the present invention can be advantageously obtained on a device or apparatus or plant of the same applicant for manufacturing tubular food films for food packaging, such as, for example, shrink films or shrink bags, by the jet-blow process, if the device for rapidly cooling thin thermoplastic tubes after their extrusion disclosed in patent specification DE 199 16 428 B4 of the same applicant is additionally used. For this purpose, a corresponding further development according to patent specification DE 100 48 178 84 can also be taken into account.

Therein, the tubular film produced from the plastic melt in the nozzle blow head is subjected to intensive cooling, during which the amorphous structure of the thermoplastics from the plastic melt is retained. The tubular film vertically extruded from the plastic melt in the nozzle blow head initially moves without wall contact into the cooling device for cooling, as described in detail in the DE 199 16 428 B4 and DE 100 48 178 B4 publications. In order to avoid repetition, full reference is made to the contents of DE 199 16 428 B4 and DE 100 48 178 B4 with regard to details of the process, structure and operation of this cooling system, which is also referred to as a calibration device.

The tubular film then passes through supports in the cooling system, against which the film is supported as a result of a differential pressure between the interior of the tubular film and the coolant, wherein a liquid film or liquid coating is maintained between the film and the supports, so that sticking of the tubular film is precluded. The diameter of the supports thereby influences the diameter of the tubular film, which is why this cooling system of the same applicant is also referred to as a calibration device.

According to the invention, polyamide (PA) can be a substance selected from a group consisting of PA of ε-caprolactam or poly(s-caprolactam) (PA6), PA of hexamethylenediamine and adipic acid or polyhexamethyleneadipinamide (PA6.6), PA of ε-caprolactam and hexamethylenediamineladipic acid (PA6.66), PA of hexamethylenediamine and dodecanedioic acid or polyhexamethylenedodecanamide (PA6.12), PA of 11-aminoundecanoic acid or polyundecanamide (PA11), PA of 12-laurinlactam or poly(ω-laurinlactam) (PA12), or a mixture of these PAs or a mixture of these PAs with amorphous PA or with other polymers. The general notation PAx.y is synonymous with PAx/y or PAxy.

For the purpose of this application, polyolefin (PO) may be a substance selected from a group consisting of PP, PE, LDPE, LLDPE, polyolefin plastomer (POP), ethylene-vinyl acetate copolymers (EVA), ethylene-methyl methacrylate copolymers (EMMA), ethylene-methacrylic acid copolymers (EMA), ethylene-acrylic acid copolymers (EAA), copolymers of cycloolefins/cycloalkenes and 1-alkenes or cycloolefin copolymers (COC), ionomers (IO) or a mixture or blend thereof. Furthermore, in the context of the present invention, PO also includes a blend of the above PO with ionomers and/or with adhesion promotors.

In the context of the present invention, polyester may be used as a layer component for the layer (a). Polyesters are polymers with ester functions in their main chain and may be, in particular, aliphatic or aromatic polyesters. Polyesters can be obtained by polycondensation of corresponding dicarboxylic acids with diols. Any dicarboxylic acid suitable for forming a polyester can be used to synthesize the polyester, in particular terephthalic acid and isophthalic acid, as well as dimers of unsaturated aliphatic acids. As the further component for the synthesis of the polyester, diols can be used, such as: Polyalkylene glycols, such as ethylene glycol, propylene glycol, tetranethylene glycol, neopentyl glycol, hexamethylene glycol, diethylene glycol, polyethylene glycol and polytetramethylene oxide glycol: 1,4-cyclohexanedimethanol, and 2-alkyl-1,3-propanediol.

PET, which stands for the polyester polyethylene terephthalate (PET), is particularly preferred. PET can be obtained by polycondensation of terephthalic acid (1,4-benzenedicarboxylic acid) and ethylene glycol (1,2-dihydroxyethane).

Another preferred polyester are polylactides or polylactic acids (PLA), which may be included as a layer component in the layers for which a polyester is provided as a layer component. These polymers are biocompatible/biodegradable and have high melting temperatures or high melting points and good tensile strength, in addition to low moisture absorption.

In the context of the present invention, EVOH stands for EVOH as well as for a blend of EVOH with other polymers, ionomers, EMA or EMMA. In particular, EVOH also includes a blend of EVOH and PA or of EVOH and ionomer.

Adhesion promotors (HV) may be provided as intermediate layers in the composite film according to the invention and represent adhesive layers that provide good bonding adhesion between the individual layers. In this context, HV can be based on a basic substance or base material, selected from a group, consisting of PE, PP, EVA, EMA, EMMA, EAA and an ionomer, or a mixture thereof. Particularly suitable adhesion promotors (HV) according to the invention are EVA, EMA or EMMA, each with a purity of >99%, preferably >99.9%.

According to a further preferred embodiment, layers comprising HV as layer component may also comprise a mixture of PO and HV or a mixture of EVA, EMA, EMMA and/or EAA and HV or a mixture of ionomer and HV or a mixture of a plurality of HV.

For the purposes of the present invention, the melting point of a polymer is determined by means of dynamic differential calorimetry or differential thermal analysis in accordance with DIN 51007:2019-04 or DIN EN ISO 11357-1:2017-02. Alternatively, the ASTM D3418 method is also known from the state of the art.

For the purposes of the present invention, the softening point of a polymer is determined according to the method for determining the Vicat softening temperature (VST) according to DIN EN ISO 306:2014-03.

For the purposes of this invention, printability is measured according to DIN 16500-2:2018-09.

For the purposes of the present invention, the designation of a material as a "layer component" means that a layer of the composite film according to the invention comprises this material at least in part. In this context, the designation "layer component" within the meaning of the present invention may in particular include that the layer consists entirely or exclusively of this material.

For the purposes of the present invention, "middle" or "intermediate" layer means a layer of the composite film which is disposed between the layer (a) and the layer (c). According to the invention, the layer (a) is the layer which forms an outward surface of the composite film (outermost layer). According to the invention, the layer (c) is the layer which forms a surface of the composite film facing or coming into contact with the good to be packaged (innermost layer). By definition, the layers (a) and (c) of the composite film according to the invention cannot be a "middle" or "intermediate" layer.

Preferably, the composite film according to the invention is sheet-like or tubular. Preferably, the composite film is a food film or food casing. The composite film is further preferably suitable for use as a non-heatshrinkable packaging material.

Examples of coextruded and biaxially stretched multilayer films with barrier function according to the invention with at least three layers (a), (b) and (c)

3-Layer Structures

| (a) | (b) | (c) |
|---|---|---|
| PA | EVOH | PO |

Examples of coextruded and biaxially stretched multilayer films with barrier function according to the invention with at least four layers (a), (b), (d) and (c)

4-Layer Structures

| (a) | (d) | (b) | (c) |
|---|---|---|---|
| PET | PO | EVOH | PO |
| PA | PO | EVOH | PO |
| PET | PO | PVDC | PO |
| PA | PO | PVDC | PO |
| PET | PO | PA | PO |
| PA | PO | PA | PO |

5-Layer Structures

| (a) | (d1) | (b) | (d2) | (c) |
|---|---|---|---|---|
| PET | PO | EVOH | HV | PO |
| PA | PO | EVOH | HV | PO |
| PET | PO | PVDC | HV | PO |
| PA | PO | PVDC | HV | PO |
| PET | PO | PA | HV | PO |
| PA | PO | PA | HV | PO |

7-Layer Structures

| (a) | (d1) | (d2) | (d3) | (b) | (d4) | (c) |
|---|---|---|---|---|---|---|
| PET | HV | PO | HV | EVOH | HV | PO |
| PA | HV | PO | HV | EVOH | HV | PO |
| PET | HV | PO | HV | PVDC | HV | PO |
| PA | HV | PO | HV | PVDC | HV | PO |
| PET | HV | PO | HV | PA | HV | PO |
| PA | HV | PO | HV | PA | HV | PO |

9-Layer Structures

| (a) | (d1) | (d2) | (d3) | (b1) | (b2) | (b3) | (d4) | (c) |
|---|---|---|---|---|---|---|---|---|
| PET | HV | PO | HV | PA | EVOH | PA | HV | PO |
| PA | HV | PO | HV | PA | EVOH | PA | HV | PO |

The invention claimed is:

1. A method for producing a multilayered composite film, the method comprising at least the following steps:
   a step of coextruding at least three layers, including a first layer, a second layer and a third layer, wherein:
      the first layer forms an outward surface of the composite film;
      the third layer forms a surface of the composite film facing or coming in contact with a good to be packaged; and
      the second layer is disposed between the first layer and the third layer;
      wherein the second layer consists of a single layer or a plurality of the second layers;
   a step of stretching the coextruded composite film; and
   a step of relaxing the stretched composite film;
   wherein the stretching is bi-axial;
   wherein a stretch factor in the machine direction or longitudinal direction is at least 2.0;
   wherein a stretch factor in the transversal direction is at least 2.0;
   wherein the sum of the stretch factor in the machine direction and the stretch factor in the transversal direction is at least 5.0;
   wherein the composite film has a temperature of 70 to 130° C. during stretching;
   wherein a relaxation factor in the machine direction is more than 0.00;
   wherein a relaxation factor in the transversal direction is more than 0.00;
   wherein the sum of the relaxation factor in the machine direction and the relaxation factor in the transversal direction is at least 0.05;
   wherein the composite film has a temperature of 60 to 180° C. during relaxation;
   wherein a dwell time during relaxation, is at least 2 seconds;
   wherein a dwell time during relaxation is at most 30 seconds, or the duration of relaxation is at most 30 seconds;
   wherein a residual stretch factor in the machine direction is at most 5.0;
   wherein a residual stretch factor in the transversal direction is at most 5.0;
   wherein the first layer comprises a thermoplastic resin having a density of greater than 1.00 g/cm$^3$;
   wherein the second layer or the plurality of the second layers each comprises a thermoplastic resin having a density of greater than 1.00 g/cm$^3$; and
   wherein the third layer comprises a thermoplastic resin having a density of less than 0.95 g/cm$^3$.

2. A method for producing a multilayered composite film, the method comprising at least the following steps:
   a step of coextruding at least four layers, including the first layer, the second layer, the third layer and a fourth layer; wherein:
      the first layer forms an outward surface of the composite film;
      the third layer forms a surface of the composite film facing or coming in contact with a good to be packaged; and
      the second layer is disposed between the first layer and the third layer;
      the fourth layer is disposed between the first layer and the third layer, preferably between the first layer and the second layer;
      wherein the second layer consists of a single layer or a plurality of layers;
      wherein the fourth layer consists of a single layer or a plurality of layers;
   a step of stretching the coextruded composite film; and
   a step of relaxing the stretched composite film;
   wherein the stretching is bi-axial;
   wherein a stretch factor in the machine direction or longitudinal direction is at least 2.0;
   wherein a stretch factor in the transversal direction is at least 2.0;
   wherein the sum of the stretch factor in the machine direction and the stretch factor in the transversal direction is at least 5.0;
   wherein the composite film has a temperature of 70 to 130° C. during stretching;
   wherein a relaxation factor in the machine direction is more than 0.00;
   wherein a relaxation factor in the transversal direction is more than 0.00;
   wherein the sum of the relaxation factor in the machine direction and of the relaxation factor in the transversal direction is at least 0.05;
   wherein the composite film has a temperature of 60 to 180° C. during relaxation;
   wherein a dwell time during relaxation is at least 2 seconds;
   wherein a dwell time during relaxation is at most 30 seconds, or the duration of relaxation is at most 30 seconds;
   wherein a residual stretch factor in the machine direction is at most 5.0;
   wherein a residual stretch factor in the transversal direction is at most 5.0;
   wherein the first layer comprises a thermoplastic resin having a density of greater than 1.00 g/cm$^3$;
   wherein the fourth layer or the plurality of the fourth layers each comprises a thermoplastic resin having a density of less than 1.00 g/cm$^3$;
   wherein the second layer or the plurality of the second layers each comprises a thermoplastic resin having a density of greater than 1.00 g/cm$^3$; and
   wherein the third layer comprises a thermoplastic resin having a density of less than 0.95 g/cm$^3$.

3. The method according to claim 1, wherein the thermoplastic resin of the first layer and the thermoplastic resin of the second layer are different; or
   the thermoplastic resin of the first layer is different from the thermoplastic resin of the second layer or from all thermoplastic resins of the plurality of the second layers; or
   the thermoplastic resin of the first layer and the thermoplastic resin of the second layer are identical; or
   the thermoplastic resin of the first layer is identical to at least one of the thermoplastic resins of the plurality of the second layers.

4. The method according to claim 1, wherein the thermoplastic resin of the first layer has a melting temperature of more than 170° C.; and/or
   the thermoplastic resin of the third layer is a polyolefin having a sealing temperature lower than the sealing temperature of the thermoplastic resin of the first layer; and/or
   the thermoplastic resin of the third layer is a polyolefin having a melting temperature of less than 120° C.; and/or the thermoplastic resin of the second layer has an oxygen permeability of less than 100 $cm^3/m^2 \cdot d \cdot bar$ or the thermoplastic resins of the plurality of the second layers each or in total have an oxygen permeability of less than 100 $cm^3/m^2 \cdot d \cdot bar$; and/or the second layer has an oxygen permeability of less than 100 $cm^3/m^2 \cdot d \cdot bar$ or the plurality of the second layers each or in total have an oxygen permeability of less than 100 $cm^3/m^2 \cdot d \cdot bar$; and/or the stretching is carried out simultaneously or successively in several stages; and/or the composite film after stretching and relaxation has a shrinkage of less than 0.05 in the machine direction (MD); and/or the composite film after stretching and relaxation has a shrinkage of less than 0.05 in the transversal direction (TD); and/or the composite film after stretching and relaxation preferably has a sum of the shrinkage in the machine direction and the shrinkage in the transversal direction of less than 0.05.

5. The method according to claim 1, wherein
the thickness of the first layer does not exceed 20% of the thickness of the entire composite film; and/or
the thickness of the second layer or the total thickness of the plurality of the second layers does not exceed 20% of the thickness of the entire composite film; and/or
the mass proportion of the first layer relative to the total mass of the composite film does not exceed 10%; and/or
the mass proportion of the second layer or the sum of the mass proportions of the plurality of the second layers relative to the total mass of the composite film does not exceed 10%;
and/or
the sum of the mass proportions of the first layer and the second layer or of the first layer and the plurality of the second layers relative to the total mass of the composite film does not exceed 10%.

6. The method according to claim 1, wherein
the thermoplastic resin of the first layer contains a polyester, or a polylactic acid or a polylactide, a polyamide, an ethylene-vinyl alcohol copolymer or any mixture thereof, and/or
the thermoplastic resin of the third layer comprises a polyolefin and/or a polypropylene, an ethylene-vinyl acetate copolymer, an ionomer, an ethylene-methyl methacrylate copolymer, an ethylene-methacrylic acid copolymer, or any mixture thereof.

7. A multilayered, coextruded, biaxially stretched, and relaxed composite film, comprising at least a first layer, a second layer and a third layer, wherein:
the first layer forms an outward surface of the composite film;
the third layer forms a surface of the composite film facing or coming in contact with a good to be packaged; and
the second layer is disposed between the first layer and the third layer;
wherein the second layer consists of a single layer or a plurality of layers;
wherein a residual stretch factor of the composite film in a machine direction is at most 5.0;
wherein a residual stretch factor of the composite film in a transversal direction is at most 5.0;
wherein the first layer comprises a thermoplastic resin having a density of greater than 1.00 $g/cm^3$;
wherein the second layer or the plurality of the plurality of the second layers each comprises a thermoplastic resin having a density of greater than 1.00 $g/cm^3$; and
wherein the third layer comprises a thermoplastic resin having a density of less than 0.95 $g/cm^3$.

8. The multilayered, coextruded, biaxially stretched, and relaxed composite film according to claim 7, comprising at least four layers including the first layer, the second layer, the third layer and a fourth layer, wherein:
the fourth layer is disposed between the first layer and the third layer;
wherein the fourth layer consists of a single layer or a plurality of layers;
wherein the fourth layer or the plurality of the fourth layers each comprises a thermoplastic resin, having a density of less than 1.00 $g/cm^3$, preferably less than 0.98 $g/cm^3$.

9. The composite film according to claim 7, wherein
the thermoplastic resin of the first layer and the thermoplastic resin of the second layer are different; or
the thermoplastic resin of the first layer is different from the thermoplastic resin of the second layer or from all thermoplastic resins of the plurality of second layers; or
the thermoplastic resin of the first layer and the thermoplastic resin of the second layer are identical; or
the thermoplastic resin of the first layer is identical to at least one of the thermoplastic resins of the plurality of second layers.

10. The composite film according to claim 7, wherein
the thermoplastic resin of the first layer has a melting temperature of more than 170° C.; and/or
the thermoplastic resin of the third layer is a polyolefin having a sealing temperature lower than the sealing temperature of the thermoplastic resin of the first layer; and/or
the thermoplastic resin of the third layer is a polyolefin having a melting temperature of less than 120° C.; and/or
the thermoplastic resin of the second layer has an oxygen permeability of less than 100 $cm^3/m^2 \cdot d \cdot bar$ or the thermoplastic resins of the plurality of second layers each or in total have an oxygen permeability of less than 100 $cm^3/m^2 \cdot d \cdot bar$; and/or
the second layer has an oxygen permeability of less than 100 $cm^3/m^2 \cdot d \cdot bar$ or the plurality of second layers each or in total have an oxygen permeability of less than 100 $cm^3/m^2 \cdot d \cdot bar$.

11. The composite film according to claim 7, wherein
the composite film after stretching and relaxation has a shrinkage of less than 0.05 in the machine direction; and/or
the composite film after stretching and relaxation has a shrinkage of less than 0.05 in the transversal direction; and/or
the composite film after stretching and relaxation preferably has a sum of the shrinkage in the machine direction and the shrinkage in the transversal direction of less than 0.05.

12. The composite film according to claim 7, wherein
the thickness of the first layer does not exceed 20% of the thickness of the entire composite film; and/or
the thickness of the second layer or the total thickness of the plurality of second layers does not exceed 20% of the thickness of the entire composite film; and/or
the mass proportion of the first layer relative to the total mass of the composite film does not exceed 10%; and/or the mass proportion of the second layer or the sum of the mass proportions of the plurality of second layers relative to the total mass of the composite film does not exceed 10%; and/or the sum of the mass proportions of the first layer and second layer or of the first layer and the plurality of second layers relative to the total mass of the composite film does not exceed 10%.

13. The composite film according to claim 7, wherein the thermoplastic resin of the first layer contains a polyester, or a polylactic acid or a polylactide, a polyamide, an ethylene-vinyl alcohol copolymer, or any mixture thereof; and/or the thermoplastic resin of the third layer comprises a polyolefin, and/or a polypropylene, an ethylene-vinyl acetate copolymer, an ionomer, an ethylene-methyl methacrylate copolymer, an ethylene-methacrylic acid copolymer, or any mixture thereof.

14. Packaging for a food product, a luxury food product or a liquid or solid comprising the multilayered composite film according to claim 7.

15. The packaging according to claim 14, wherein the mass proportion of the layer components having a melting temperature of more than 170° C. is 1 to <40% relative to the total mass of the composite film.

16. The method according to claim 1, wherein the mass proportion of the layer components having a melting temperature of more than 170° C. is 1 to <40% relative to the total mass of the composite film.

17. The composite film according to claim 7, wherein the mass proportion of the layer components having a melting temperature of more than 170° C. is 1 to <40% relative to the total mass of the composite film.

* * * * *